US009014302B2

(12) United States Patent
Yang (10) Patent No.: US 9,014,302 B2
(45) Date of Patent: *Apr. 21, 2015

(54) METHOD AND APPARATUS FOR MAPPING SIGNALS TO SUBCARRIERS IN MIMO WIRELESS NETWORK

(71) Applicant: Alcatel Lucent, Paris (FR)

(72) Inventor: Hong-wei Yang, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 110 days.

This patent is subject to a terminal disclaimer.

(21) Appl. No.: 13/628,658

(22) Filed: Sep. 27, 2012

(65) Prior Publication Data

US 2013/0051340 A1    Feb. 28, 2013

Related U.S. Application Data

(63) Continuation of application No. 12/374,766, filed as application No. PCT/CN2007/002161 on Jul. 16, 2007, now Pat. No. 8,306,151.

(30) Foreign Application Priority Data

Sep. 15, 2006    (CN) .......................... 2006 1 0116123

(51) Int. Cl.
*H04L 27/00*    (2006.01)
*H04L 5/00*    (2006.01)
(Continued)

(52) U.S. Cl.
CPC .............. *H04L 5/0044* (2013.01); *H04B 7/068* (2013.01); *H04B 7/12* (2013.01); *H04L 1/04* (2013.01);
(Continued)

(58) Field of Classification Search
CPC ....... H04L 1/06; H04L 1/0612; H04L 1/0618; H04L 27/2626; H04L 27/2627; H04L 27/2601; H04L 27/2602; H04L 27/2647; H04B 7/067
USPC ......................................... 375/299, 260, 267
See application file for complete search history.

(56) References Cited

U.S. PATENT DOCUMENTS

| 7,711,060 B1 | 5/2010 | Lou et al. |
| 8,194,777 B2 | 6/2012 | Sandhu |

(Continued)

FOREIGN PATENT DOCUMENTS

| CN | 1579063 | 2/2005 |
| CN | 1674572 | 9/2005 |

(Continued)

OTHER PUBLICATIONS

Alcatel, "Effect of Different ST/SF Coding and Mapping Schemes on the PAPR of the SC-FDMA in E-UTRA Uplink", 3GPP TSG RAN WGI #45, Shanghai, China, May 8-12, 2006, pp. 1-6.

(Continued)

*Primary Examiner* — Emmanuel Bayard
(74) *Attorney, Agent, or Firm* — Fay Sharpe LLP (57) ABSTRACT

A method for mapping signals to subcarriers in a sending means of a MIMO-based wireless telecommunication network and an apparatus for the same. It is characterized in that, controlling the mapping of the signals in an input signal sequence to the subcarriers, so that the signals sent by different antennas at the same time correspond to nonadjacent signals in the input signal sequence. With the aid of the present invention, burst error due to deep fading channel can be effectively avoided, and diversity gains can be also improved.

18 Claims, 4 Drawing Sheets (51) Int. Cl.
*H04B 7/06* (2006.01)
*H04B 7/12* (2006.01)
*H04L 1/04* (2006.01)
*H04L 1/06* (2006.01)
*H04L 1/18* (2006.01)

(52) U.S. Cl.
CPC ............... *H04L 1/06* (2013.01); *H04L 1/0618* (2013.01); *H04L 1/1819* (2013.01); *H04L 1/1893* (2013.01); *H04L 5/0023* (2013.01)

(56) References Cited

U.S. PATENT DOCUMENTS

| | | |
|---|---|---|
| 2004/0131011 A1 | 7/2004 | Sandell et al. |
| 2005/0099937 A1 | 5/2005 | Oh et al. |
| 2005/0180515 A1 | 8/2005 | Orihashi et al. |
| 2005/0283705 A1 | 12/2005 | McNamara |
| 2006/0036924 A1* | 2/2006 | Ghosh ........................ 714/755 |
| 2007/0025463 A1* | 2/2007 | Aldana ........................ 375/267 |
| 2007/0160160 A1 | 7/2007 | Kakura |
| 2007/0217546 A1 | 9/2007 | Sandell et al. |
| 2007/0255993 A1 | 11/2007 | Yap et al. |
| 2007/0258525 A1* | 11/2007 | Jacobsen et al. .............. 375/260 |
| 2008/0095262 A1 | 4/2008 | Ho et al. |
| 2010/0195630 A1 | 8/2010 | Sutivong et al. |
| 2010/0278283 A1 | 11/2010 | Sandhu |
| 2011/0310847 A1 | 12/2011 | Ma et al. |
| 2012/0224615 A1* | 9/2012 | Sandhu ........................ 375/219 |

FOREIGN PATENT DOCUMENTS

| | | |
|---|---|---|
| CN | 1778048 | 5/2006 |
| EP | 1 533 929 | 5/2005 |
| EP | 1 788 742 | 5/2007 |
| WO | WO 2005/062510 | 7/2005 |

OTHER PUBLICATIONS

Bauch, "Space-Time-Frequency Transmit Diversity in Broadband Wireless OFDM Systems", in Proc. of 8$^{th}$ Int'l OFDM Workshop, Hamburg, Germany, Sep. 24-25, 2003, 6 pgs.
International Preliminary Report on Patentability, International Application No. PCT/CN2007/002161, Jan. 2004.
International Search Report, International Application No. PCT/CN2007/002161, Nov. 1, 2007.
Written Opinion, International Application No. PCT/CN2007/002161, Nov. 1, 2007.

* cited by examiner

METHOD AND APPARATUS FOR MAPPING SIGNALS TO SUBCARRIERS IN MIMO WIRELESS NETWORK

REFERENCE TO RELATED APPLICATIONS

This application is a continuation of and claims priority to and the benefit of U.S. patent application Ser. No. 12/374,766, filed on Jan. 22, 2009, entitled THE METHOD AND APPARATUS FOR MAPPING SIGNALS TO SUBCARRIERS IN MIMO WIRELESS NETWORK, which is a National Stage Entry of PCT/CN2007/002161 filed Jul. 16, 2007, and which claims priority to CN 200610116123.7 filed Sep. 15, 2006, the entireties of which applications are hereby incorporated by reference.

FIELD OF THE INVENTION

The present invention relates to wireless network, and particularly to the method and apparatus for mapping signals to subcarriers in MIMO wireless network.

BACKGROUND OF THE INVENTION

Orthogonal Frequency Division Multiplexing (OFDM) and Orthogonal Frequency Division Multiple Access (OFDMA) are promising multiple subcarriers high data rate transmission schemes, which are referred to as 'OFDM-like technology' uniformly hereinafter. The basic idea is to convert high speed serial data into branches of relatively low speed parallel data, and then modulate the orthogonal carriers. By using OFDM-like technology, the spectral utilization rate will be greatly enhanced, and the system becomes much stronger against Multipath Fading and narrowband interference. OFDM-like technology is considered as one of the core technologies of the fourth generation mobile communication, and is widely used in high speed wireless data telecommunication systems such as World Interoperability for Microwave Access (WiMAX).

Multi-input Multi-output (MIMO) system is a telecommunication system whose receiver and transmitter are both configured with multiple antennas, so that it is possible to provide high speed wireless data transmission. In a flat fading channel with lower SNR but less influence to the Bit Error Rate, MIMO system can provide important data rate gain or diversity gain. In practice, there are ways to implement MIMO, such as: Space-Time Coding (STC) based on Alamouti code and spatial multiplexing.

Obviously, the combination of OFDM and MIIMO can bring us better data transmission scheme with high speed.

Figure 1:
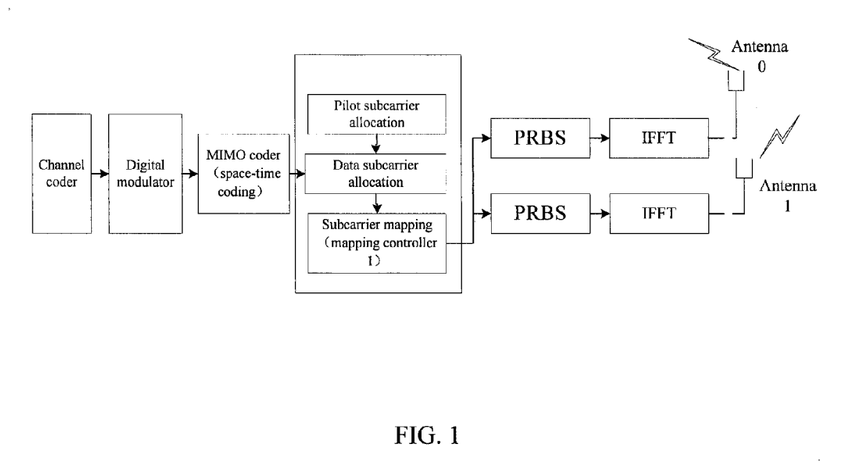
FIG. 1 shows the schematic view of a sending means in telecommunication system which has combined OFDM-like technology and MIMO technology.

See FIG. 1, FIG. 1 shows the schematic view of a typical sending means in a telecommunication network combining OFDM-like technology and MIMO.

Hereinafter, the signal processing flow in the sending means will be described, wherein, the MIMO system is applied with the Partial Usage of SubChannel (PUSC) mode; the modulation is QPSK; the rate of channel coding is 1/2; STBC is used.

1) Source bit stream $b_0 \ldots b_{47}$ are channel coded, so that the channel coded bit stream $c_0 \ldots c_{95}$ is generated.

Figure 2:
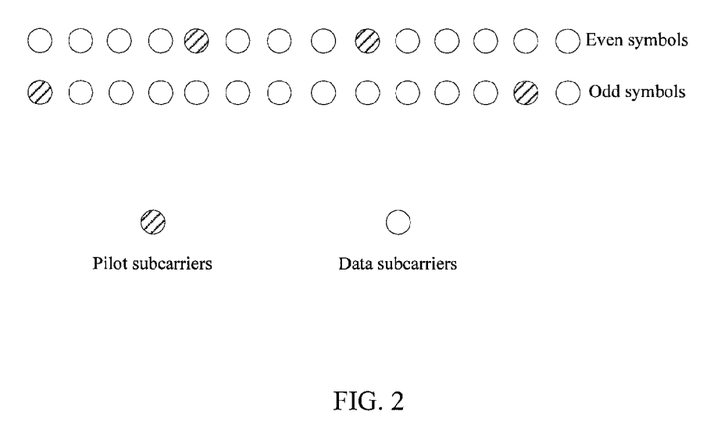
FIG. 2 shows the method for classifying subcarriers with first level logical addresses into clusters, and allocating pilot subcarriers and data subcarriers in each cluster.

2) Channel coded bit stream enters the interleaver for interleaving (not shown), and then will be mapped to the constellation of the QPSK modulator, so as to generate modulated symbol stream $s_0 \ldots s_{47}$, say $\{S_n\}$ (each modulated symbol comprising two channel coded bits). Hereunder, without specific statement, modulated symbols stand for the symbols generated after digital modulation in this step;

3) When using Space-Time coding, the MIMO coder will perform Space-Time coding on the input modulated symbol stream. Here, since the aim of Space-Time coding is to realize MIMO, it is also called MIMO coding. The MIMO symbol stream generated can be in the form of: $\{s_0, s_1\}, \{s_2, s_3\}, \ldots, \{s_{46}, s_{47}\}$ and $\{-s_1^*, s_0^*\}, \{-s_3^*, s_2^*\}, \ldots, \{-s_{47}^*, s_{46}^*\}$;

4) Before IFFT, N (let N=1024) subcarriers are numbered as 0, 1, ..., 1023 from low frequency to high frequency, as the physical address of subcarriers. By eliminating the number zero subcarrier and the virtual subcarriers therefrom, the remained subcarriers are numbered again, as their first level logical address. Then, the subcarriers with first level logical address are classified into clusters, so that each cluster will comprise physical subcarriers as shown in FIG. 2. And the pilot subcarriers shall be allocated according to the manner shown in FIG. 2.

5) After the allocation of pilot subcarriers, other subcarriers are called data subcarriers. Then, a permutation will be done with respect to the data subcarriers, and then they will be further numbered as $I_1, I_2, \ldots, I_{840}$, as the second level logical address of the data subcarriers in correspondence with the discrete physical address.

6) Then, the subcarrier mapping module is responsible for mapping the MIMO symbol stream to the data subcarriers with the second level logical address. It is easy to understand that, for a sending means using spatial multiplexing (no need of MIMO coding), the subcarrier mapping module will map the modulated symbol stream generated in the step 2) to the data subcarriers.

In existing sending means using spatial multiplexing, after the aforesaid steps, mapping the modulated symbol stream $s_0 \ldots s_{47}$ to data subcarriers is shown in Table. 1. Wherein, a sending means with 2 transmitting antennas is taken as an example. However, it should be understood that, the present invention is not limited to systems with 2 transmission antennas.

TABLE 1

| Spatial multiplexing, 2 antennas | |
|---|---|
| Antenna 0 | Antenna 1 |
| s0 | s1 |
| s2 | s3 |
| s4 | s5 |
| s6 | s7 |
| s8 | s9 |
| s10 | s11 |
| s12 | s13 |
| s14 | s15 |
| s16 | s17 |
| s18 | s19 |
| s20 | s21 |
| s22 | s23 |
| s24 | s25 |
| s26 | s27 |
| s28 | s29 |
| s30 | s31 |
| s32 | s33 |
| s34 | s35 |
| s36 | s37 |
| s38 | s39 |
| s40 | s41 |
| s42 | s43 |
| s44 | s45 |
| s46 | s47 |

Wherein, the symbols in the same row are mapped to the same data subcarrier, say their mapping objects have the same physical address. Then, the Inverse Fast Fourier Transform (IFFT) modules, corresponding to the two transmitting antennas respectively, will perform IFFT process on the signals in correspondence with the antennas, so that two OFDM symbols will be generated, realizing the conversion from frequency domain to time domain. Wherein, the modulated symbols mapped to the same data subcarrier will be located at the same position in the two OFDM symbols. $s_0 \ldots s_{47}$ are the modulated symbols generated by the digital modulator shown in FIG. 1 (using QPSK etc. modulation method) in the first time slot.

From Table 1, it can be seen that, in prior art, the modulated symbols mapped to the same data subcarrier correspond to adjacent symbols in $s_0 \ldots s_{47}$. Therefore, when the channel is in deep fading, the terminal has moved into deep fading zones like a jungle, since the decoder at the receiver cannot decode successfully, $s_0$ and $s_1$ will be deemed as wrong. Since $s_0$ and $s_1$ are adjacent symbols in the modulated symbol sequence, and comprise adjacent coded bits such as $c_0$, $c_1$, $c_2$ and $c_3$ in the coded bit stream $c_0 \ldots c_{95}$, hence, there is a burst error.

In a telecommunication system, burst errors are always undesired. Hence, a solution is needed to avoid burst errors in the aforesaid OFDM-like MIMO system.

For conciseness, FIG. 1 has not shown all means (modules) of the telecommunication system for implementing the combination of OFDM-like technology and MIMO technology. However, those skilled in this art can know well, with the aid of FIG. 1 and the description above, the technical problems existing in the prior art to be solved by the present invention. Also, those skilled in this art will have a good understanding of the solution provided by the present invention by reading the description below with reference to the drawings.

SUMMARY OF THE INVENTION

The present invention is proposed to solve the problems of the prior art.

According to the first aspect of the invention, there is provided a method, in a sending means in MIMO-based wireless telecommunication network, for mapping signals to subcarriers, characterized in that, controlling the mapping of the signals in an input signal sequence to the subcarriers, so that the signals sent by different antennas at the same time correspond to nonadjacent signals in the input signal sequence. Particularly, the method comprises steps as follows: mapping consecutive signals in a signal sequence to M subcarriers, so that the signals mapped to the same subcarrier are nonadjacent signals in the signal sequence; modulating the signals onto the corresponding subcarriers to which the signals have been mapped, so as to generate multiple modulated signal groups, wherein, every modulated signal group comprises M signals mapped to different subcarriers; controlling to send said multiple modulated signal groups via different antennas.

According to the second aspect of the invention, there is provided a mapping controller, in a sending means in MIMO-based wireless telecommunication network, for mapping signals to subcarriers, characterized in that, controlling the mapping of the signals in an input signal sequence to the subcarriers, so that the signals sent by different antennas at the same time correspond to nonadjacent signals in the input signal sequence. Particularly, the controller comprises: a mapping means, for mapping consecutive signals in a signal sequence to M subcarriers, so that the signals mapped to the same subcarrier are nonadjacent signals in the signal sequence; a modulator, for modulating the signals onto the corresponding subcarriers to which the signals have been mapped, so as to generate multiple modulated signal groups, wherein, every modulated signal group comprises M signals mapped to different subcarriers; sending controller, for controlling to send said multiple modulated signal groups via different antennas.

As compared with the prior art, the solution provided by the present invention has advantages as below:
1. when carrying out the first time transmission using spatial multiplexing, burst error caused by deep fading channel can be well avoided;
2. the diversity gains have been enhanced.

BRIEF DESCRIPTION OF THE DRAWINGS

Other features and advantages of the present invention will be obvious by reading the following description of non-limiting exemplary embodiments, with reference to the appended drawings.

DETAILED DESCRIPTION OF EMBODIMENTS

Detailed description of the invention is given below with reference to the appended drawings. It should be noted that, the illustrative steps for realizing the methods and the illustrative structures of the devices shall not be understood as limiting the protection scope of the present invention.

In order to describe the technical solution of the present invention clearer, some basic principles of OFDM-like systems are explained as below:

In a typical OFDM-like system, a modulated symbol stream $\{S_n\}$ will be got after the digital modulation with one of BPSK, QPSK, 16QAM, wherein, n=0, 1, . . . , M−1. M modulated symbols thereof will be mapped onto M sub-channels (M data subcarriers). Each of the modulated symbols is used to modulate one of the M data subcarriers. Then, the IFFT module is used to perform IFFT process on them to generate an OFDM symbol. This flow is repeated to process the following M modulated symbols. Certainly, before being transmitted on the channel, an OFDM symbol will experience CP (Cyclic Prefix) adding, D/A (digital/analog) conversion, up frequency conversion etc. Since these processes are all well known and are not directly related to the present invention, they are not shown in FIG. 1 and there is no need to give unnecessary details.

Figure 3:
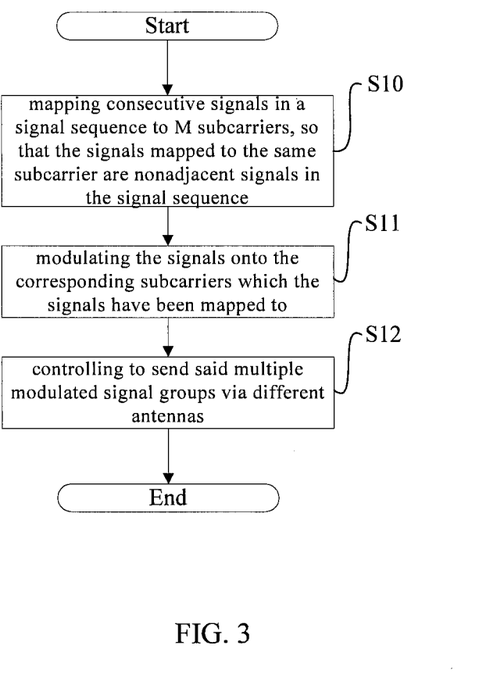
FIG. 3 shows the flow chart of the method, in a sending means of a MIMO-based wireless telecommunication network, for mapping the signals to subcarriers according an embodiment of the invention.

The method of subcarrier mapping provided by the present invention will be described with reference to FIG. 3. FIG. 3 shows the flow chart of the method, in a sending means in a MIMO-based wireless telecommunication network, for mapping the signals to subcarriers according an embodiment of the invention.

According to an embodiment of the invention, the method can be implemented in the subcarrier mapping module (mapping controller 1) shown in FIG. 1, for achieving the technical object of the invention.

The innovation of the invention consist in that, controlling the mapping of the signals in an input signal sequence to the subcarriers, to be specific, the data subcarrier, so that the signals sent by different antennas at the same time correspond to nonadjacent signals in the input signal sequence. Wherein, according to one embodiment of the invention, the input signal sequence is a modulated symbol stream outputted by a digital modulator applying modulation method such as QPSK/16QAM. And, said signals in the input signal sequence are the modulated symbols outputted by the digital modulator.

As mentioned above, in Table 1, $s_0$ and $s_1$ are signals sent on different antennas at the same time. But, contrary to the invention, $s_0$ and $s_1$ correspond to adjacent signals in the input signals sequence $\{S_n\}$.

The method shown in FIG. 3 starts with the step S10:

In step S10, the mapping controller 1 maps the signals in the input signal sequence onto M data subcarriers, say M data subcarriers with different physical addresses, so that the symbols mapped onto the same data subcarriers are nonadjacent symbols in $\{S_n\}$. Wherein, the aforesaid modulated symbol stream $\{S_n\}$ is still taken as an example here, without loss of generality. For a better explanation of the invention, please see Table 2, wherein, one embodiment of the invention has been shown:

TABLE 2

Spatial multiplexing, 2 antennas

| Antenna 0 | Antenna 1 |
| --- | --- |
| s0 | s24 |
| s1 | s25 |
| s2 | s26 |
| s3 | s27 |
| s4 | s28 |
| s5 | s29 |
| s6 | s30 |
| s7 | s31 |
| s8 | s32 |
| s9 | s33 |
| s10 | s34 |
| s11 | s35 |
| s12 | s36 |
| s13 | s37 |
| s14 | s38 |
| s15 | s39 |
| s16 | s40 |
| s17 | s41 |
| s18 | s42 |
| s19 | s43 |
| s20 | s44 |
| s21 | s45 |
| s22 | s46 |
| s23 | s47 |

In this embodiment, M=24; modulated symbols $s_0 \ldots s_{47}$ correspond to the modulated symbols generated by the modulator in the first time slot and belong to a part of a packet. Said packet comprises 96 modulated symbols in total. When the decoding with respect to this packet at the receiver fails, the transmitter (said sending means) will resend the whole packet. The details about the resending will be described later.

It should be understood that, the mapping method as shown in Table 2 is not the only one subcarrier mapping method provided by the present invention. On the premise that the signals sent by different antennas at the same time are nonadjacent signals in the original signal sequence, there are various ways to map $s_0 \ldots s_{47}$ to the 24 data subcarriers. For conciseness, a slot comprising 10 modulated symbols $s_0 \ldots s_9$ is taken as an example. With the mapping process in step S10, the symbol-in-pair mapped to the same data subcarrier can be: $(s_0,s_8)$, $(s_3,s_5)$, $(s_6,s_2)$, $(s_1,s_9)$, $(s_4,s_7)$. It can be seen that, the symbols sent on the different antennas at the same time are nonadjacent symbols of said modulated symbol stream, so as to avoid burst error.

In order to implement the signal transmission manner shown in Table 2, mapping symbols to the subcarriers only is not enough, the method further proceed to the step S11.

In step S11, $s_0 \ldots s_{47}$, which are generated by the digital modulator in this time slot (the first time slot) and mapped to the 24 data subcarriers in step S10, will be used to modulate the data subcarriers to which they have been mapped, so as to generate two modulated signal groups, say $s_0, s_1 \ldots s_{23}$ and $s_{24}, s_{25} \ldots s_{47}$. It should be understood that, according to the different mapping methods used in S10, the form of the modulated signal groups generated under the present invention are not limited to this. With the abovementioned example, it can be known that the modulated signal groups could be: $\{s_0, s_3, s_6, s_1, s_4\}$ and $\{s_8, s_5, s_2, s_9, s_7\}$. Then, the method enters S12.

In step S12, the mapping controller 1 controls to send the two modulated signal groups $s_0, s_1 \ldots s_{23}$ and $s_{24}, s_{25} \ldots s_{47}$ generated in S11 via different antennas. In particular, it determines the transmitting antenna for each modulated signal group. And then each modulated signal group will be allocated to the processing means such as PRBS (Pseudo Random Bit Sequence) module, IFFT (Inverse Fast Fourier Transform) module etc. which corresponds to the transmitting antenna determined for this modulated signal group, for the purpose of further processing. Similarly, the method for allocating modulated signal groups to transmitting antennas shown in FIG. 2 is not the only one provided by the invention, that's to say, it is also doable to send $s_{24}, s_{25} \ldots s_{47}$ on antenna 0 and send $s_0, s_1 \ldots s_{23}$ on antenna 1. It should be understood that, in a multi-antenna sending device equipped with more than 2 antennas, the process in S12 can have more choices.

Obviously, any one of the 24 pairs of symbols modulated to the 24 subcarriers consists of two nonadjacent symbols in $\{S_n\}$, in particular, of symbols corresponding to nonadjacent channel coded bits. Taking $s_0$ and $s_{24}$ in the first row of Table 2 as an example, wherein, the aforesaid channel coded bit stream $c_0 \ldots c_{95}$ is also taken into account. And $s_0$ corresponds to $c_0$ and $c_1$; $s_{24}$ corresponds to $c_{46}$ and $c_{47}$. Even the channel encounters deep fading, $s_0$, $s_{24}$ go wrong due to the failed decoding, since $s_0$, $s_{24}$ correspond to nonadjacent channel coded bits ($c_0$, $c_1$; $c_{46}$, $c_{47}$), the error brought by the failed decoding due to deep fading will be random error, instead of burst error.

Figure 4:
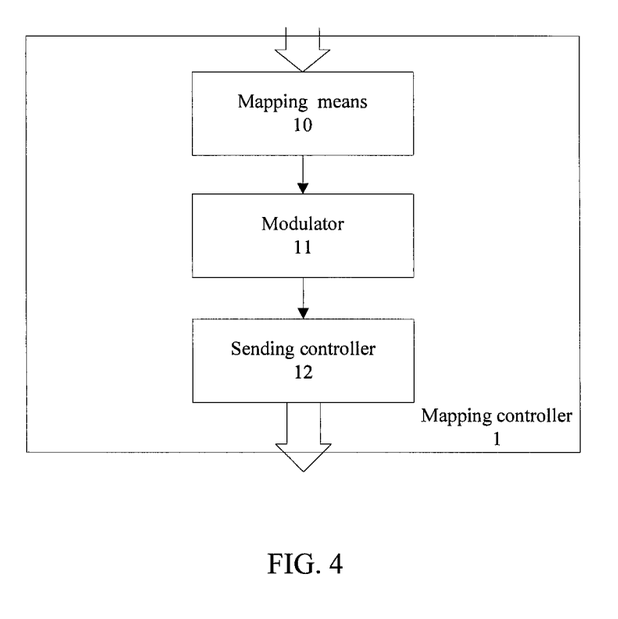
FIG. 4 shows the block diagram of the mapping controller, in a sending means of a MIMO-based wireless telecommunication network, for mapping signals to subcarriers according to an embodiment of the invention.

The mapping controller 1 provided by the present invention will be described with reference to FIG. 4. FIG. 4 shows the block diagram of the mapping controller, in a sending means of a MIMO-based wireless telecommunication network, for mapping signals to subcarriers according to an embodiment of the invention.

According to an embodiment of the invention, the mapping controller 1 is an improved mapping controlling module as shown in FIG. 1. That's to say, the subcarrier mapping module in FIG. 1 can be implemented by the mapping controller 1 provided by the present invention, so as to achieve the technical object(s) thereof.

The innovation of the invention consist in that, controlling the mapping of the signals in an input signal sequence to the subcarriers, to be specific, the data subcarrier, so that the signals sent by different antennas at the same time correspond to nonadjacent signals in the input signal sequence. Wherein, according to one embodiment of the invention, the input signal sequence is a modulated symbol stream $\{S_n\}$ outputted by a digital modulator applying modulation method such as QPSK/16QAM. And, said signals in the input signal sequence are the modulated symbols outputted by the digital modulator.

As mentioned above, in Table 1, $s_0$ and $s_1$ are signals sent on different antennas at the same time. But, contrary to the invention, $s_0$ and $s_1$ correspond to adjacent signals in the input signals sequence.

The mapping controller 1 shown in FIG. 4 comprises: a mapping means 10, a modulator 11 and a sending controller 12.

Said mapping means 10 maps the signals in the input signal sequence onto M data subcarriers, say M data subcarriers with different physical addresses, so that the symbols mapped onto the same data subcarriers are nonadjacent symbols in $\{S_n\}$. Wherein, the aforesaid modulated symbol stream $\{S_n\}$ is still taken as an example here, without loss of generality, and the symbols in $\{S_n\}$ is also taken as an example. For a better explanation of the invention, please see Table 2.

In this embodiment, M=24; modulated symbols $s_0 \ldots s_{47}$ correspond to the modulated symbols generated by the digital modulator in the first time slot and belong to a part of a packet. Said packet comprises 96 modulated symbols $s_0 \ldots s_{95}$ in total. When the decoding with respect to this packet at the receiver fails, the transmitter (said sending means) will resend the whole packet. The details about the resending will be described later.

It should be understood that, the mapping method as shown in Table 2 is not the only one mapping method provided by the present invention. On the premise that the signals sent by different antennas at the same time are nonadjacent signals in original signal sequence, there are various ways to map $s_0 \ldots s_{47}$ to the 24 data subcarriers. For conciseness, a slot comprising 10 modulated symbols $s_0 \ldots s_9$ is taken as an example. With the mapping process in step S10, the symbol-in-pair mapped to the same data subcarrier can be: $(s_0,s_8)$, $(s_3,s_5)$, $(s_6,s_2)$, $(s_1,s_9)$, $(s_4,s_7)$. It can be seen that, the symbols sent on the different antennas at the same time are nonadjacent symbols of said modulated symbol stream, so as to avoid burst error.

Then $s_0 \ldots s_{47}$, which are generated by the digital modulator in this time slot (the first time slot) and mapped to the 24 data subcarriers by the mapping controller 10, will be used by the modulator 11 to modulate the data subcarriers to which they have been mapped to, so that two modulated signal groups are generated, say $s_0,s_1 \ldots s_{23}$ and $s_{24},s_{25} \ldots s_{47}$. It should be understood that, according to different mapping methods used by the mapping means 10 in S10, the form of the modulated signal groups generated by the modulator 11 in the mapping controller 1 under the present invention are not limited to this. With the abovementioned example, it can be known that the modulated signal groups could be: $\{s_0, s_3, s_6, s_1, s_4\}$ and $\{s_8, s_5, s_2, s_9, s_7\}$. Then, the modulator 11 delivers the generated modulated signal groups to said sending controller 12.

The sending controller 12 controls to send the two modulated signal groups $s_0, s_1 \ldots s_{23}$ and $s_{24}, s_{25} \ldots s_{47}$ generated by the modulator 11 via different antennas. In particular, it determines the transmitting antenna for each modulated signal group. And then each modulated signal group will be allocated the processing means such as PRBS (Pseudo Random Bit Sequence) module, IFFT (Inverse Fast Fourier Transform) module etc. which corresponds to the transmitting antenna determined for this modulated signal group, for the purpose of further processing. Similarly, the method for allocating modulated signal groups to transmitting antennas above shown in Table 2 is not the only one provided by the invention, that's to say, it is also doable to send $s_{24}, s_{25} \ldots s_{47}$ on antenna 0 and to send $s_0, s_1 \ldots s_{23}$ on antenna 1. It should be understood that, in a multi-antenna sending device equipped with more than 2 antennas, the process in S12 can have more choices.

Obviously, any one of the 24 pairs of symbols modulated to the 24 subcarriers consists of two nonadjacent symbols in $\{S_n\}$, in particular, of symbols corresponding to nonadjacent channel coded bits. Taking $s_0$ and $s_{24}$ in the first row of Table 2 as an example, wherein, the aforesaid channel coded bit stream $c_0 \ldots c_{95}$ is also taken into account. And $s_0$ corresponds to $c_0$ and $c_1$; $s_{24}$ corresponds to $c_{46}$ and $c_{47}$. Even the channel encounters deep fading, $s_0$, $s_{24}$ go wrong due to the failed decoding, since $s_0$, $s_{24}$ correspond to nonadjacent channel coded bits ($c_0$, $c_1$; $c_{46}$, $c_{47}$), the error brought by the failed decoding due to deep fading will be random error, instead of burst error.

By reading the description in connection with resending process hereinafter, the advantages of the present invention as compared with the prior art will be clearer.

In the above paragraphs, for conciseness, when describing the background and one embodiment of the invention, only the modulated symbol stream outputted by the digital modulator in the first time slot has been shown in Tables 1 and 2. The mapping schemes showing the whole packet is in Tables 3 and 4. Similar to Table 2, Table 4 also stands for only one embodiment of the invention. The signal mapping scheme corresponding to the method and apparatus for subcarrier mapping provided by the present invention shall not be understood to be limited by what in Table 4.

TABLE 3

Signal mapping schemes in the prior art
Spatial multiplexing, 2 antennas

| Antenna 0 | | Antetnna 1 | |
| --- | --- | --- | --- |
| Time slot 1 | Time slot 2 | Time slot 1 | Time slot 2 |
| s0 | s48 | s1 | s49 |
| s2 | s50 | s3 | s51 |
| s4 | s52 | s5 | s53 |
| s6 | s54 | s7 | s55 |
| s8 | s56 | s9 | s57 |
| s10 | s58 | s11 | s59 |
| s12 | s60 | s13 | s61 |
| s14 | s62 | s15 | s63 |
| s16 | s64 | s17 | s65 |
| s18 | s66 | s19 | s67 |
| s20 | s68 | s21 | s69 |
| s22 | s70 | s23 | s71 |
| s24 | s72 | s25 | s73 |
| s26 | s74 | s27 | s75 |
| s28 | s76 | s29 | s77 |
| s30 | s78 | s31 | s79 |
| s32 | s80 | s33 | s81 |
| s34 | s82 | s35 | s83 |
| s36 | s84 | s37 | s85 |
| s38 | s86 | s39 | s87 |
| s40 | s88 | s41 | s89 |
| s42 | s90 | s43 | s91 |
| s44 | s92 | s45 | s93 |
| s46 | s94 | s47 | s95 |

TABLE 4 signal mapping scheme provided by the present invention
Spatial Multiplexing, 2 antennas

| Antenna 0 | | Antenna 1 | |
|---|---|---|---|
| Time slot 1 | Time slot 2 | Time slot 1 | Time slot 2 |
| s0 | s48 | s24 | S72 |
| s1 | S49 | s25 | S73 |
| s2 | S50 | s26 | S74 |
| s3 | S51 | s27 | S75 |
| s4 | S52 | s28 | S76 |
| s5 | S53 | s29 | S77 |
| s6 | S54 | s30 | S78 |
| s7 | S55 | s31 | S79 |
| s8 | S56 | s32 | S80 |
| s9 | S57 | s33 | S81 |
| s10 | S58 | s34 | S82 |
| s11 | S59 | s35 | S83 |
| s12 | S60 | s36 | S84 |
| s13 | S61 | s37 | S85 |
| s14 | S62 | s38 | S86 |
| s15 | S63 | s39 | S87 |
| s16 | S64 | s40 | S88 |
| s17 | S65 | s41 | S89 |
| s18 | S66 | s42 | S90 |
| s19 | S67 | s43 | S91 |
| s20 | S68 | s44 | S92 |
| s21 | S69 | s45 | S93 |
| s22 | S70 | s46 | S94 |
| s23 | S71 | s47 | S95 |

Wherein, the symbols on the same row are carried by the same data subcarrier, say being mapped to and modulating the same data subcarrier. It can be seen that, the contents corresponding to Time slot 1 in Tables 3 and 4 are exactly the ones in Tables 1 and 2. As mentioned above, in this example, the packet comprises 96 symbols. When the decoding with respect to said packet fails, because the channel is in deep fading or something like that, the sending means will need to resend this packet.

It should be understood that, in the prior art, and said embodiment of the invention, the initial transmission of signals uses the subcarrier mapping method shown in Table 3 or 4.

Taking a sending means with 2 transmitting antennas as an example, in the prior art, the resending scheme is shown in Table 5.

TABLE 5

| | Initial transmission | the Odd time of transmission | the even time of transmission |
|---|---|---|---|
| space-time coding incremental redundancy | $S_2^{(0)} = \begin{bmatrix} s_1 \\ s_2 \end{bmatrix}$ | $S_2^{(odd)} = \begin{bmatrix} -s_2^* \\ s_1^* \end{bmatrix}$ | $S_2^{(even)} = \begin{bmatrix} s_1 \\ s_2 \end{bmatrix}$ |

The Table 5 will be explained in conjunction with Table 3. Wherein, the subscript '2' at the left side of '=' (the equation) represents that the sending means is equipped with 2 transmitting antennas. For the initial transmission which can be considered as an even time of transmission, please see the four symbols in the first row of Table 3, say $s_0$, $s_{48}$, $s_1$ and $s_{49}$. Wherein, the symbols (signals) sent on the two transmitting antennas in the first time slot are: $s_0$ and $s_1$. Then turn to Table 5, it is clear that the matrix for the initial transmission is $$S_2^{(0)} = \begin{bmatrix} S_0 \\ S_1 \end{bmatrix}.$$

Hence, the matrix of an odd time of transmission should be $$S_2^{(odd)} = \begin{bmatrix} -S_1^* \\ S_0^* \end{bmatrix},$$

wherein, since the initial transmission has been numbered with 0, all of the first time of resending, the third time of resending will be taken as an odd time of transmission. In an odd time of transmission, the symbols (signals) sent on the two transmitting antennas in the first time slot are $-S_1^*$ and $S_0^*$. And the matrix of an even time of transmission, which could be understood to include the initial transmission, is $$S_2^{(even)} = \begin{bmatrix} S_0 \\ S_1 \end{bmatrix}.$$

In an even time of transmission, the symbols (signals) sent on the two transmitting antennas in the first time slot are: $S_0$ and $S_1$. For other pairs of symbols (including the symbols corresponding to Time slot 2), the method shown in Table 5 is used to generate space-time coding incremental redundancy. Therefore, from Table 3, we can get:

TABLE 6

The mapping scheme for an odd time of transmission in the prior art
Spatial multiplexing, 2 antennas

| Antenna 0 | | Antenna 1 | |
|---|---|---|---|
| Time slot 1 | Time slot 2 | Time slot 1 | Time slot 2 |
| −s1* | −s49* | s0* | S48* |
| −s3* | −s51* | S2* | S50* |
| −s5* | −s53* | S4* | S52* |
| −s7* | −s55* | S6* | S54* |
| −s9* | −s57* | S8* | S56* |
| −s11* | −s59* | S10* | S58* |
| −s13* | −s61* | S12* | S60* |
| −s15* | −s63* | S14* | S62* |
| −s17* | −s65* | S16* | S64* |
| −s19* | −s67* | S18* | S66* |
| −s21* | −s69* | S20* | S68* |
| −s23* | −s71* | S22* | S70* |
| −s25* | −s73* | S24* | S72* |
| −s27* | −s75* | S26* | S74* |
| −s29* | −s77* | S28* | S76* |
| −s31* | −s79* | S30* | S78* |
| −s33* | −s81* | S32* | S80* |
| −s35* | −s83* | S34* | S82* |
| −s37* | −s85* | S36* | S84* |
| −s39* | −s87* | S38* | S86* |
| −s41* | −s89* | S40* | S88* |
| −s43* | −s91* | S42* | S90* |
| −s45* | −s93* | S44* | S92* |
| −s47* | −s95* | S46* | S94* |

With respect to the mapping scheme for an even time of transmission, it can be seen from Table 5 that the subcarrier mapping scheme used in an even time of transmission is exactly the same as the one used in initial transmission. Hence see Table 3, obviously, by combining the incremental redundancy in Tables 3 and 6, spatial diversity can be achieved.

Wherein, sending signals with multiple antennas or receiving signals with multiple signals can both achieve spatial diversity.

Nevertheless, the adjacent symbols in the input signal sequence (said modulated symbol stream), e.g. $s_0$ and $s_1$ are more or less correlated with each other. Each pair of such adjacent or near symbols in Table 3 or Table 6, including the symbols in said modulated symbol stream and the redundancy generated via processing symbols in said modulated symbol stream with space-time coding like $S_0{}^*$, are modulated onto the same subcarrier (corresponding to the same frequency) pair by pair, so that some frequency diversity has been lost.

According to an embodiment of the invention, the present invention still uses the resending scheme shown in Table 5. Hence, from Tables 4 and 5, we can get:

TABLE 7

The mapping scheme for an odd time of transmission according to the present invention.
Spatial multiplexing, 2 antennas

| Antenna 0 | | Antenna 1 | |
| --- | --- | --- | --- |
| Time slot 1 | Time slot 2 | Time slot 1 | Time slot 2 |
| −s24* | −s48* | s0* | S72* |
| −s25* | −s49* | s1* | S73* |
| −s26* | −s50* | s2* | S74* |
| −s27* | −s51* | s3* | S75* |
| −s28* | −s52* | s4* | S76* |
| −s29* | −s53* | s5* | S77* |
| −s30* | −s54* | s6* | S78* |
| −s31* | −s55* | s7* | s79* |
| −s32* | −s56* | s8* | s80* |
| −s33* | −s57* | s9* | S81* |
| −s34* | −s58* | s10* | S82* |
| −s35* | −s59* | s11* | S83* |
| −s36* | −s60* | s12* | S84* |
| −s37* | −s61* | s13* | S85* |
| −s38* | −s62* | s14* | S86* |
| −s39* | −s63* | s15* | S87* |
| −s40* | −s64* | s16* | S88* |
| −s41* | −s65* | s17* | S89* |
| −s42* | −s66* | s18* | S90* |
| −s43* | −s67* | s19* | S91* |
| −s44* | −s68* | s20* | S92* |
| −s45* | −s69* | s21* | S93* |
| −s46* | −s70* | s22* | S94* |
| −s47* | −s71* | s23* | S95* |

When using the resending scheme in Table 5, the subcarrier mapping scheme used by an even time of transmission under the present invention is the same as the one used for the initial transmission. See Tables 4 and 7, obviously, by combining the incremental redundancy in Tables 4 and 7, spatial diversity can be obtained. Wherein, sending signals with multiple antennas or receiving signals with multiple signals can both achieve spatial diversity. Besides, comparing with the prior art, the present invention has advantages as below:

The adjacent or near symbols in the input signal sequence (said modulated symbol stream), e.g. $s_0$ and $s_1$ are more or less correlated with each other. As in Table 4 or 7, each pair of such adjacent symbols, including the symbols in said modulated symbol stream and the redundancy generated via processing the symbols in said modulated symbol stream with space-time coding like $S_0{}^*$, are modulated onto different subcarriers (corresponding to the different frequency). Obviously, symbols modulated onto the same subcarriers, which means being sent/received with the same frequency, correspond to symbols much away from each other in said modulated symbol stream, so that the frequency diversity has been optimized.

Although the embodiments of the present invention have been described above, it is understandable by those skilled in the art that various modifications can be made without departing from the scope and spirit of the attached claims.

What is claimed is:

1. A controller, comprising:
    at least one processor programmed to:
        map a plurality of signals of an input signal sequence to an integer number M subcarriers, where M is greater than 1, such that the signals mapped to the same subcarrier are nonadjacent signals in the input signal sequence, and
        control a modulator to modulate the plurality of signals of the input signal sequence onto corresponding subcarriers to which the signals have been mapped to generate a plurality of modulated signal groups, wherein the modulated signal groups individually comprise M signals modulated onto different subcarriers, and
        control a MIMO-based wireless transmitter to transmit the a plurality of modulated signal groups via different antennas such that signals sent by the different antennas at the same time correspond to nonadjacent signals in the input signal sequence.

2. The controller of claim 1, wherein the at least one processor is programmed to map a plurality of signals of the input signal sequence to an integer number M subcarriers for a retransmission such that signals sent on different antennas at the same time correspond to nonadjacent signals in the input signal sequence of an initial transmission.

3. The controller of claim 2, wherein every modulated signal group comprises consecutive input signals of the input signal sequence.

4. The controller of claim 1, wherein every modulated signal group comprises consecutive input signals of the input signal sequence.

5. A mapping apparatus for mapping signals to subcarriers in a MIMO-based wireless telecommunication network, comprising:
    a mapping component implemented using at least one processor configured to map consecutive signals of an input signal sequence to an integer number M subcarriers, where M is greater than 1, such that the signals sent by different antennas at the same time correspond to nonadjacent signals in the input signal sequence, and such that the signals mapped to the same subcarrier are nonadjacent signals in the input signal sequence;
    a modulator configured to modulate the signals onto corresponding subcarriers to which the signals have been mapped to generate a plurality of modulated signal groups, wherein every modulated signal group comprises M signals modulated onto different subcarriers; and
    a sending controller implemented using the at least one processor configured to provide the modulated signal groups to different antennas.

6. The mapping apparatus of claim 5, wherein the mapping component is configured to map a plurality of signals of the input signal sequence to an integer number M subcarriers for a retransmission such that signals sent on different antennas at the same time correspond to nonadjacent signals in the input signal sequence of an initial transmission.

7. The mapping apparatus of claim 6, wherein every modulated signal group comprises consecutive input signals of the input signal sequence.

8. The mapping apparatus of claim 5, wherein every modulated signal group comprises consecutive input signals of the input signal sequence.

9. A transmitter, comprising:
at least one processor programmed to map a plurality of signals of an input signal sequence to an integer number M subcarriers, where M is greater than 1 such that the signals mapped to the same subcarrier are nonadjacent signals in the input signal sequence;
a modulator operative to modulate the plurality of signals of the input signal sequence onto the corresponding subcarriers to which the signals have been mapped to generate a plurality of modulated signal groups, wherein the modulated signal groups individually comprise M signals modulated on different subcarriers; and
a MIMO-based wireless transmitter component operative to transmit the a plurality of modulated signal groups via different antennas such that signals sent by the different antennas at the same time correspond to nonadjacent signals in the input signal sequence.

10. The transmitter of claim 9, wherein the transmitter component uses spatial multiplexing transmission for initial transmission of the plurality of signals.

11. The transmitter of claim 10, wherein the at least one processor is programmed to map a plurality of signals of the input signal sequence to an integer number M subcarriers for a retransmission such that signals sent on different antennas at the same time correspond to nonadjacent signals in the input signal sequence of an initial transmission.

12. The transmitter of claim 11, wherein every modulated signal group comprises consecutive input signals of the input signal sequence.

13. The transmitter of claim 10, wherein every modulated signal group comprises consecutive input signals of the input signal sequence.

14. The transmitter of claim 9, wherein every modulated signal group comprises consecutive input signals of the input signal sequence.

15. The transmitter of claim 14, wherein every modulated signal group comprises consecutive input signals of the input signal sequence.

16. The transmitter of claim 9, wherein every modulated signal group comprises consecutive input signals of the input signal sequence.

17. A mapping apparatus for mapping signals to subcarriers in a MIMO-based wireless telecommunication network, comprising:
a mapping component implemented using at least one processor configured to map consecutive signals of an input signal sequence to an integer number M subcarriers for a retransmission, where M is greater than 1, such that the signals sent by different antennas at the same time for the retransmission correspond to nonadjacent signals in the input signal sequence of an initial transmission;
a modulator configured to modulate the signals onto corresponding subcarriers to which the signals have been mapped to generate a plurality of modulated signal groups for the retransmission, wherein every modulated signal group comprises M signals modulated onto different subcarriers; and
a sending controller implemented using the at least one processor configured to provide the modulated signal groups to different antennas.

18. The mapping apparatus of claim 17, wherein every modulated signal group comprises consecutive input signals of the input signal sequence.

* * * * *